(12) United States Patent
Wegerich

(10) Patent No.: US 7,085,675 B2
(45) Date of Patent: Aug. 1, 2006

(54) SUBBAND DOMAIN SIGNAL VALIDATION

(75) Inventor: Stephan W. Wegerich, Glendale Heights, IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 10/360,843

(22) Filed: Feb. 6, 2003

(65) Prior Publication Data

US 2003/0220767 A1 Nov. 27, 2003

Related U.S. Application Data

(60) Provisional application No. 60/354,626, filed on Feb. 6, 2002.

(51) Int. Cl.
*G06F 16/00* (2006.01)
*G06F 17/18* (2006.01)

(52) U.S. Cl. ........................................ 702/181
(58) Field of Classification Search ................ 702/180, 702/181, 179, 183
See application file for complete search history.

(56) References Cited

U.S. PATENT DOCUMENTS 5,764,698 A * 6/1998 Sudharsanan et al. ...... 375/241
6,299,346 B1 * 10/2001 Ish-Shalom et al. ........ 374/126
6,332,961 B1 * 12/2001 Johnson et al. ........ 204/192.13
6,678,421 B1 * 1/2004 Daniell et al. .............. 382/240
6,701,274 B1 * 3/2004 Eryurek et al. ............. 702/140
2001/0049590 A1 * 12/2001 Wegerich ................... 702/189
2002/0029130 A1 * 3/2002 Eryurek et al. ............. 702/183
2002/0055826 A1 * 5/2002 Wegerich et al. ............. 703/2
2002/0083773 A1 * 7/2002 Ben-Romdhane ............ 73/660
2002/0087290 A1 * 7/2002 Wegerich et al. ........... 702/182
2002/0091499 A1 * 7/2002 Wegerich et al. ........... 702/182
2002/0152056 A1 * 10/2002 Herzog et al. ................. 703/2
2002/0183971 A1 * 12/2002 Wegerich et al. ........... 702/185
2003/0033094 A1 * 2/2003 Huang ......................... 702/39
2003/0086341 A1 * 5/2003 Wells et al. ............. 369/13.56
2004/0066966 A1 * 4/2004 Schneiderman ............. 382/159

* cited by examiner

*Primary Examiner*—Bryan Bui
*Assistant Examiner*—Demetrius Pretlow
(74) *Attorney, Agent, or Firm*—Foley & Lardner LLP

(57) ABSTRACT

A system, method and program product for predictive condition monitoring of a monitored system by means of sub-band decomposition of a complex monitored signal. Features of the decomposed signal are extracted for modeling estimation and detection of deviations in the features. Deviations are indicative of impending monitored system fault.

20 Claims, 2 Drawing Sheets

SUBBAND DOMAIN SIGNAL VALIDATION

CROSS-REFERENCE TO RELATED PATENT APPLICATIONS

This application claims priority to U.S. provisional patent application No. 60/354,626 which was filed on Feb. 6, 2002.

BACKGROUND OF THE INVENTION

1. Field of the Invention

The present invention relates to process and machine modeling and system monitoring, especially for predictive condition monitoring. More particularly, the invention relates to condition monitoring of a system using an empirical model having inputs derived from complex signal decomposition using a sub-band technique.

2. Description of the Related Art

A number of advanced techniques have been developed to provide improved monitoring and control of equipment and processes, for example in an industrial setting. Such techniques have the potential of providing earlier detection of equipment failure and process upset, as well as finer control, and offer an alternative to simpler, threshold-based alarm condition monitoring systems, which merely examine the raw value of a single sensor signal in isolation against an absolute threshold. One such advanced technique is described in U.S. Pat. No. 4,937,763 to Mott, improved in U.S. Pat. No. 5,764,509 to Gross et al. Therein, an empirical model of proper equipment or process operational states is created from exemplary data, which model can be used in real-time monitoring to generate estimates of expected sensor readings in response to receiving actual sensor readings from equipment or process instrumentation. The expected readings are compared to the actual readings to provide indications of abnormality indicating impending equipment failure or process upset. These techniques are able to provide such indications long before conventional thresholding techniques would detect any problem, and thereby provide valuable lead-time in responding to developing faults.

These techniques take advantage of the information inherent in the (often unknown) relationships between the parameters measured by the sensors, to provide such advanced condition monitoring. As a consequence, these techniques work only in the context of sensor readings for multiple, related (correlated) parameters. Theoretically, at least three sensors are required to build the requisite model, and in practice even more sensors are necessary. This limits the applicability of these advanced techniques to equipment and processes instrumented with multiple sensors for correlated parameters. It would be beneficial to be able to apply these techniques to circumstances where uninstrumented equipment or processes could be retrofitted with just one sensor, such as an acoustic pickup, or to monitoring which generates just one complex signal as a composite picture of system operation, such as an EKG signal for a heart.

In a related field prior art, vibration analysis, methods are known for examining the power spectral density function from an accelerometer or acoustic pickup to provide means for monitoring rotating or cyclic equipment. Typically, frequencies of interest are examined, and thresholds (lower or upper limit) are placed on the power level expected for these frequencies. If a threshold is pierced, this is indicative of an unsatisfactory operating condition or a developing problem. A great deal of work is involved in identifying the frequencies of interest and expected power levels for each particular piece of equipment that is monitored in this fashion. Problem diagnosis is also typically very specific to the kinds of indications presented with the appearance of the particular problem, and must be worked out specifically for each machine. It would be useful to have an empirical data-driven way of determining the health or the operational state of a machine or other process state based on one or more vibration or acoustic signals, data from a process or other figure of merit or state data.

What is needed is a way to apply the advanced empirical modeling techniques for condition monitoring of signals from any "monitored system" including without limitation: equipment or processes, such as those signals that are monitored in the field of vibration monitoring, and further in the medical arts, the biological field generally, the chemical technology area, business and financial fields, mechanical arts generally, meteorology and any process providing data susceptible of condition monitoring.

SUMMARY OF THE INVENTION

The present invention achieves the above needs by means of a sub-band decomposition technique coupled with signal feature extraction for generating multivariate input to an empirical modeling engine, based on at least one composite or complex signal obtained from instrumentation on a monitored machine or process or data from any system being monitored (the "monitored system" hereinafter). The sub-band component features are provided as individual inputs to the empirical modeling engine. The empirical modeling engine compares the sub-band component features against expected values to derive more information about the state of the monitored system generating the signal.

The invention further provides an apparatus and a method for monitoring the operational state of a living or an inanimate subject. The invention permits the monitoring of the condition and location of the subject, with interaction by the subject in some cases. The nature of the monitoring may be varied as necessitated by circumstances. One or more sensors or source of data are selected appropriate to the subject monitored system and the reasons for monitoring the system. For example, the sensors could include an audio/visual sensor, a biological condition sensor, a chemical sensor, a meteorological sensor, a motion sensor, an electromagnetic sensor, a seismic sensor, an apparatus sensor and a stream of business data from a computer system.

The sub-band decomposition method can be applied to any signal obtained from any monitored system as described hereinbefore, such as an acoustic signal, an electrical current signal, a vibration signal or the like or any detectable signal or data from the medical arts, the biological field generally, the chemical technology area, business and financial fields, mechanical arts generally, meteorology and any process providing data susceptible of condition monitoring. The present invention can for example, in particular, be applied to monitoring automobile production or operation. More specifically, the present invention can be applied to engine vibration analysis, body vibration transfer analysis, noise in an automotive body, muffler vibration analysis, and the like. The vibration measurement monitoring system can also according to the present invention be a non-contact device capable of accurately monitoring a small region. The method and system can also be applied for detecting a tool breakage, such as a drill or applied to a failure in a production or method. Furthermore, the present invention can be applied to a plant or process occurrence, such as monitoring a motor, and maintenance of a water pipe and/or gas pipe for detecting leakages. Further specific examples of applications are to agriculture fields. A large fruit such as a watermelon can be "knocked", so that resultant sound can be analyzed to determine sweetness of the watermelon without cutting the watermelon. The signal is decomposed into a plurality of component signals by multi-channel sub-band filtering, each sub-band having a center frequency and filtering for a range of frequencies around it. An M-channel sub-band filter bank may be used to break a signal into M different frequency bands using multi-rate digital filtering techniques in the time domain.

Features are then extracted from the sub-band components to provide one or more feature values for each sub-band component. Features are characteristics of a signal over a shifting window of observations, such as mean or average value, variance, skewness and kurtosis. Features can be computed at periodic intervals or continuously with the shifting window, to provide sequences of feature values that are then monitored with the system of the current invention.

An empirical model for use in generating expected feature values for the monitored machine, process or source of data (the monitored system) is created from historic data representing normal operation. Data is accumulated from instrumentation on the monitored system during normal operation, and is passed through the filter bank to provide multiple sub-band signals. Features are then extracted from the sub-band signals. The feature sequences are processed with a training technique to produce an empirical model based thereon that embodies the relationships between the sub-band signals during normal or other particular state of operation.

Once the empirical model is available, the monitored system can be monitored in real-time by obtaining real-time data of the same complex signal, producing sub-band signals using the same filter bank, extracting features and comparing generated feature estimates to the "live" sub-band signal features. Differences between the estimated features and the raw features indicate incipient machine fault, process upset or other departure to a different state.

Briefly summarized, the invention is implemented in a computer or other processor, having a memory for storing the reference set of related signal values, and the empirical model of normal or particular operation of interest. An input means can be a data bus, messaging network or direct data acquisition device. A sub-band filtering technique can be embodied in an analog hardware filter bank, or in digital techniques executed on the processor or an auxiliary processor, and operates to decompose a complex signal present at the input into multiple sub-band signals. The processor is disposed to extract features, compute estimates and compare them with the actual inputs to determine differences. Detected differences can be output to a screen or data file; used to send a paging message, email or fax; or made available to downstream data processing applications in the same computer or another computing system sharing a network or bus connection. Alternatively, the pattern of the sub-band signals or their deviations can be classified to a fault diagnosis or other informative classification.

BRIEF DESCRIPTION OF THE DRAWINGS

The novel features believed characteristic of the invention are set forth in the appended claims. The invention itself, however, as well as the preferred mode of use, further objectives and advantages thereof, is best understood by reference to the following detailed description of the embodiments in conjunction with the accompanying drawings, wherein:

DETAILED DESCRIPTION OF THE PREFERRED EMBODIMENTS

Figure 1:
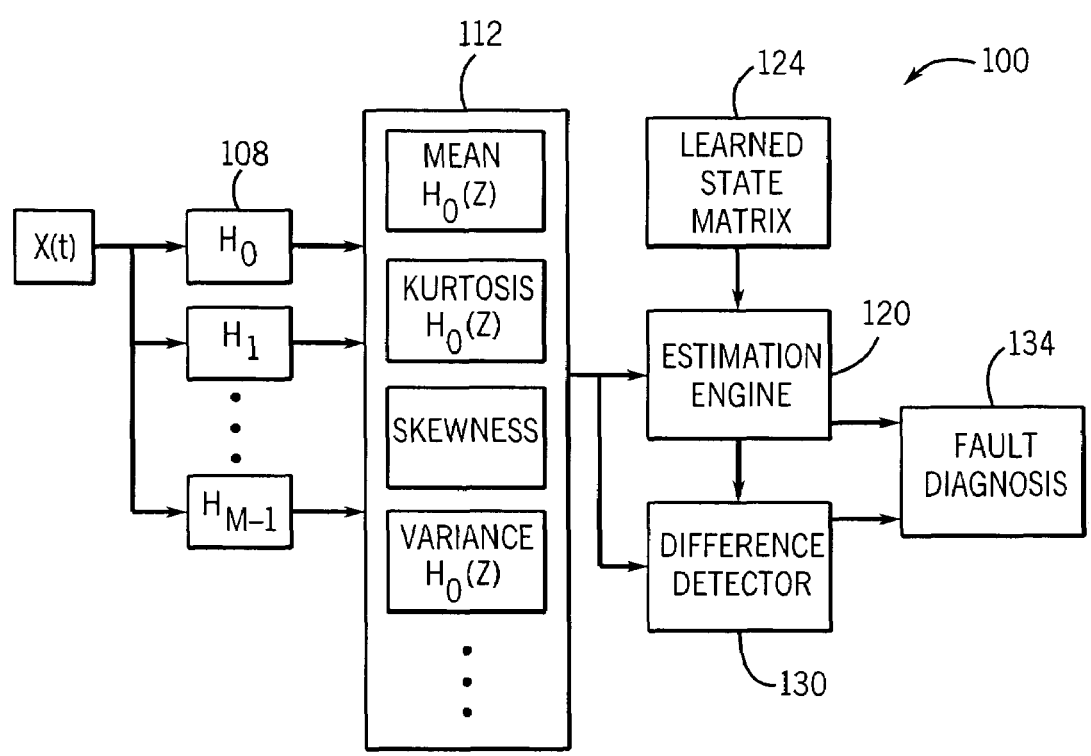
FIG. 1 is a diagram of the general embodiment of a preferred form of the present invention for signal decomposition, feature extraction and empirical modeling.

Turning now to the drawings, FIG. 1 generally shows the preferred embodiment of system 100. A signal x(t) represents some complex measured value from the monitored system being monitored, for example vibration from an accelerometer or sound level from an acoustic pick-up. M-channel filter bank 108 comprises m filters and is disposed to receive the input signal x(t) and decompose it into sub-band components. Feature extraction module 112 receives the sub-band components and generates features such as mean, variance, skewness and kurtosis for at least some of the sub-band components, over a shifting window of time samples. Estimation engine 120 receives the feature value sequences from the feature extraction module 112, and with reference to a learned state matrix 124, generates estimates for the features. These estimates are compared to the feature values determined by the module 112 in a difference detector module 130, which may employ statistical differencing tests over sequences of values. Estimates and detected differences can be supplied to a fault diagnosis module 134, which can map specific combinations of these to indicators of known and recognized faults.

Signal x(t) can be any complex parameter that reasonably contains information on the performance of the system to be monitored, especially information that reveals failure modes of the system. The system can be virtually any measurable system, such as, for example without limitation, a piece of industrial equipment; a refining process; a food/pharmaceutical preparation process; a transportation vehicle; a computer fan; a biological process or system; a weather condition; and a financial or business process. Complex signals of many types are amenable to the analysis of the present invention, including electrical voltage and current signals as, for example, might be obtained from an electro-cardiogram; an electrical signal indicative of acceleration from an accelerometer mounted to detect vibration; and an electrical signal from a microphone emplaced to detect ambient acoustics from rotating equipment. Such signals contain composite information from many subsystems, which makes monitoring and fault detection more difficult, since the information is buried amidst other irrelevant information.

Generally in the present invention, filters $H_0$ through $H_{M-1}$ in the filter bank 108 have substantially non-overlapping frequency response curves, and can comprise a uniform bank with equally spaced response curves or a non-uniform bank. Further, the filters can be analog device or digital device filters and any conventional filter means can be used. Analog filters are advantageously implemented where computational power is limited in the application, as for example on board a transportation system with limited microprocessor capability.

The feature extraction module 112 can comprise a plurality of sub-modules each dedicated to computing a particular feature for the sub-band components, or can be implemented as a unified computing module that performs all feature extraction. In feature extraction for purposes of the present invention, a sub-band signal is digitized (made into discrete values at a uniformly sampled rate) and a shifting window of samples is used to compute a feature of the stream of samples. For example, the "mean" feature is the average value of the samples in the window. The variance is the measure of variability around the mean seen across the samples in the window. A proxy for variance is standard deviation.

Skewness is a measure of the asymmetry of a set of data around the sample mean, the data in this case being the set of digitized values of the sub-band component in the shifting window. If skewness is negative, the data are spread out more to the left of the mean than to the right. If skewness is positive, the data are spread out more to the right. The skewness of the normal distribution (or any perfectly symmetric distribution) is zero. The skewness of a distribution is defined as:

$$y = \frac{E(x-\mu)^3}{\sigma^3} \quad (1)$$

where $\mu$ is the mean of x, $\sigma$ is the standard deviation of x, and $E(t)$ represents the expected value of the quantity t.

Kurtosis is a measure of how outlier-prone a distribution of data values is. The kurtosis of the classic "normal" distribution is 3. Distributions that are more outlier-prone than the normal distribution have kurtosis greater than 3; distributions that are less outlier-prone have kurtosis less than 3. The kurtosis of a distribution is defined as:

$$k = \frac{E(x-\mu)^4}{\sigma^4} \quad (2)$$

where $\mu$ is the mean of x, $\sigma$ is the standard deviation of x, and $E(t)$ represents the expected value of the quantity t.

Other features that can be extracted include root mean square, the median, percentiles, auto-regression (AR) coefficients, ARMA coefficients, auto-correlation coefficients, and other such conventional statistical characteristics.

The estimation engine 120 is a model that generates estimates in response to receiving the extracted features, at a periodic rate or with every digitized sample of the sub-band components. In the preferred embodiment of the present invention, the estimation engine is an empirical type model, which advantageously utilizes historic data of normal operation of the monitored system, for example a neural network, or even more preferably, a similarity-based model, as described below. The estimation engine 120 provides estimates of what the sub-band feature values should be in response to receiving the actual sub-band feature values. In an alternative embodiment, the estimation engine 120 can generate inferred estimates of a superset of features given an input of only a subset of features available from the sub-band components.

The difference detector 130 receives both the feature estimates from the estimation engine 120 as well as the actual features from the extraction module 112. The detector 130 generates residuals for each feature compared, being the difference between the actual feature and the estimate. The detector 130 also applies a statistical test to a series of residuals for a feature. In the preferred embodiment, the detector 130 generates residuals for at least one feature of one sub-band, and applies a conventional sequential probability ratio test (SPRT) to the series of resulting residual values to determine over a time series if there is a statistically significant difference between the actual value and the estimate from the estimation engine 120. A sensitive test such as SPRT can often determine a difference of this kind while the residual is still within the range of its normal noise. The SPRT methodology is described below.

Residuals and SPRT alerts generated by the detector 130 may, in another embodiment of the present invention, be provided to the fault diagnosis module 134, disposed to determine a failure diagnosis from the pattern of residual and/or alert data. System 100 thus may provide several kinds of monitoring output, including residual data, alert data, and diagnostic data.

The system 100 has application to any complex signal, whether naturally occurring, derived from a machine, machine operation or a process being carried out in a system or otherwise generated, naturally or artificially. In particular, the complex signal may be representative of a physical parameter of any one of a variety of systems or processes as described hereinbefore. For instance the complex signal can be an electrocardiogram signal for monitoring a heart; the current signature on the power draw of an electric motor; the pressure transducer signal from a metal stamping machine; an accelerometer on an transport chassis; and any other physical, chemical, biological or business process.

A similarity-based empirical model for use as the estimation engine 120 in the present invention references a learned state matrix of prior "known" states of a multivariate system, and generates an estimate of the expected current values of each of the multiple parameters, in response to receiving the actual current values of at least one or some of the multiple parameters. The estimates are produced as a combination of the "known" states in the learned state matrix. The estimation engine 120 determines expected values $Y_{expected}$ of a modeled system (such as an expected value for a feature of a sub-band component) according to the following equation:

$$\vec{y}_{Expected} = \overline{D} \bullet \vec{W} \quad (3)$$

where matrix D is the learned state matrix of exemplar vectors and W is a weight vector having as many elements N as there are exemplar vectors (or snapshots) in the learned state matrix D. Thus $Y_{expected}$ is a linear combination of the exemplar vectors in D according to W. Each exemplar vector in D represents a known "acceptable" state of the monitored system, and is a vector of elements, each element corresponding to a scalar value of a parameter of the monitored system, such as a feature of a sub-band component. The learned state matrix D thus comprises snapshots of states taken on by the monitored system in normal operation, as represented by the contemporaneous feature values of each state. Weight vector W is generated by:

$$\vec{W} = \frac{\hat{W}}{\left(\sum_{j=1}^{N} \hat{W}(j)\right)} \quad (4)$$

$$\hat{\vec{W}} = \left(\overline{D}^T \otimes \overline{D}\right)^{-1} \cdot \left(\overline{D}^T \otimes \vec{y}_{input}\right) \quad (5)$$

where the similarity operation is represented by the circle with the cross-hatch inside it, and $Y_{input}$ is the set of actual parameters or features measured from the monitored system in real-time. The superscript "T" here represents the transpose of the matrix, and the inverse of the matrix or resulting array is represented by the superscript "−1". Importantly, there must be row correspondence to like parameters or features for the rows in D, $Y_{input}$ and $Y_{expected}$. That is, if the first row of the learned state matrix D corresponds to values for a particular feature of a first sub-band component of the decomposed complex signal, the first element of $Y_{input}$ must also be the current value (if operating in real-time) of that same feature of that first sub-band component.

In an alternative form, the similarity-based empirical model can be used to generate expected values that are not part of the observed state vector $Y_{input}$. In this case, learned state matrix D comprises two portions, $D_{IN}$ and $D_{OUT}$. Correspondingly, expected values $Y_{expected}$ are computed by:

$$\vec{y}_{Expected} = \overline{D}_{out} \cdot \vec{W} \quad (6)$$

$$\vec{W} = \frac{\hat{W}}{\left(\sum_{j=1}^{N} \hat{W}(j)\right)} \quad (7)$$

$$\hat{\vec{W}} = (\overline{D}_{in}^T \otimes \overline{D}_{in})^{-1} \cdot (\overline{D}_{in}^T \otimes \vec{y}_{input}) \quad (8)$$

Within learned state matrix D, the $D_{IN}$ portion contains snapshots values for those parameters that are in the input vector $Y_{input}$, while $D_{OUT}$ contains the corresponding parameter values for inferred parameters.

The similarity-based model periodically receives the decomposed signal features $Y_{input}$ as signal snapshots or data frames. Each snapshot $Y_{input}$ is compared to the data snapshots in the learned state matrix D. The similarity-based model compares the current snapshot $Y_{input}$ received from the decomposition stage 112 with learned state matrix snapshots for "similarity". This measure of "similarity" is computed using a similarity operator. According to the invention, the similarity operation for a pair of snapshots or vectors being compared returns a value, typically between zero and one, where zero represents dissimilarity and one represents completely identical snapshots. More broadly, a similarity operation yields a number on a range quantitatively measuring the similarity of two compared values or vectors, said range at one extreme indicating the compared values are identical, and approaching the other extreme indicates increasing dissimilarity. For example, the similarity operator can be such that on comparison of two numbers, it yields a value of ten if the numbers are the same, and yields a value approaching zero as the two numbers diverge. Alternatively, the similarity operator can range from 10 (for identity) toward 5 (dissimilarity), indicating a bias of at least some similarity between any two numbers, or any other such range. As described below, the similarity operator can work on an element-by-element basis, comparing values for like sensors, and combining the resultant elemental similarities into a vector-to-vector similarity; or it can work wholly at the vector level. All such similarity operators would work in connection with a similarity-based model for purposes of the present invention.

The similarity operation can be selected from a variety of known operators that produce a measure of the similarity or numerical closeness of rows of the first operand to columns of the second operand. The result of the operation as generally applied to two matrix operands is a similarity matrix wherein the similarity value of the ith row and jth column is determined from the ith row of the first operand and the jth column of the second operand (the operand above being a vector $Y_{input}$ and having only one column). The resulting element (i,j) is a measure of the sameness of these two vectors. In the present invention, the ith row of the first operand generally has elements corresponding to temporally related component values for a given decomposition of the complex signal from the process or machine, and the same is true for the jth column of the second operand. Effectively, the resulting array of similarity measurements represents the similarity of a reference vector in one operand to a current input vector in the other operand.

By way of example, one similarity operator that can be used compares the two vectors (the ith row and jth column) on an element-by-element basis. Only corresponding elements are compared, e.g., element (i,m) with element (m,j) but not element (i,m) with element (n,j). For each such comparison, the similarity is equal to the absolute value of the smaller of the two values divided by the larger of the two values. Hence, if the values are identical, the similarity is equal to one, and if the values are grossly unequal, the similarity approaches zero. When all the elemental similarities are computed, the overall similarity of the two vectors is equal to the average of the elemental similarities. A different statistical combination of the elemental similarities can also be used in place of averaging, e.g., median.

Another similarity operator that can be used in the present invention is the bounded area ratio test (BART) described in U.S. Pat. No. 5,987,399, which is incorporated by reference. BART is a prior art similarity operator, wherein an internal angle is used to gauge the similarity of two values. A right triangle is formed for each sub-band feature with the base (hypotenuse) of each right triangle bounded by an expected magnitude range over all snapshots in the learned state matrix for the particular sub-band feature. The right angle vertex is preferably located at a point above the median or mean of the range, and at a height h that forms the right angle, the right angle vertex being the apex of the right triangle. At each comparison during system monitoring, BART maps two points $X_1$ and $X_0$ to the base; one point representative of an expected sub-band feature value and the second point is a current sub-band feature value. These two points are located on the base according to their magnitude within the range of values in the learned state matrix. An internal comparison angle $\theta$ is formed at the apex above the base by drawing a line to the apex from each of the mapped points:

$$\theta = \tan^{-1}\left(\frac{h}{X_1}\right) - \tan^{-1}\left(\frac{h}{X_0}\right) \quad (9)$$

The internal angle is the basis by which two values are compared for similarity, i.e., identical points result in a 0° angle and completely dissimilar points result in a right angle. Then, the elemental similarity for the $i^{th}$ element is:

$$s_i = 1 - \frac{\theta_i}{\pi/2} \quad (10)$$

As indicated above, the elemental similarities can be statistically averaged or otherwise statistically treated to generate an overall similarity of a snapshot to another snapshot, as is called for according to the invention.

Yet another class of similarity operator that can be used in the present invention involves describing the proximity of one signature vector to another vector in n-space, where n is the count of sub-band features in the input vector. If the proximity is comparatively close, the similarity of the two vectors is high, whereas if the proximity is distant or large, the similarity diminishes, ultimately vanishing. By way of example, Euclidean distance between two vectors can be used to determine similarity. In a complex signal decomposed into 20 sub-band component features for example, the Euclidean distance in 20-dimensional space between the currently monitored snapshot, comprising a 20-element vector, and each vector in the learned state matrix provides a measure of similarity, as shown:

$$S = \frac{1}{\left[1 + \frac{\left\|\vec{x} - \vec{d}\right\|^{\lambda}}{c}\right]} \quad (11)$$

wherein X is the current snapshot, and d is a vector from the learned state matrix, and $\lambda$ and c are user-selectable constants.

It should be understood that, although specific similarity operators are described herein, any conventional, general similarity operator may be used in the estimation engine 120 of the present invention.

Any number of methods can be used to populate the learned state matrix 124 with exemplar vectors of parameter data, including randomly selecting historic feature snapshots. In a typical multivariate system multiply instrumented with sensors, data is collected from a set of sensors on the system, under normal or desirable conditions, as exemplary of proper operation of the system. This collected data is distilled into the learned state matrix from which a similarity model can generate estimates of sensors under current system operation in real-time monitoring mode. For purposes of monitoring a system using complex signal decomposition into sub-band components according to the present invention, the features extracted from the various sub-band components are equivalent to multiple sensors in a typical multivariate application of similarity-based modeling. To create the learned state matrix 124 of the present invention, the complex signal of the monitored system must be recorded during normal or other desired or particular states of operation of the system, decomposed into sub-band components, and processed for feature extraction, which features become sets of time-related or contemporaneous exemplar vectors, some of which can be included in the learned state matrix.

Figure 2:
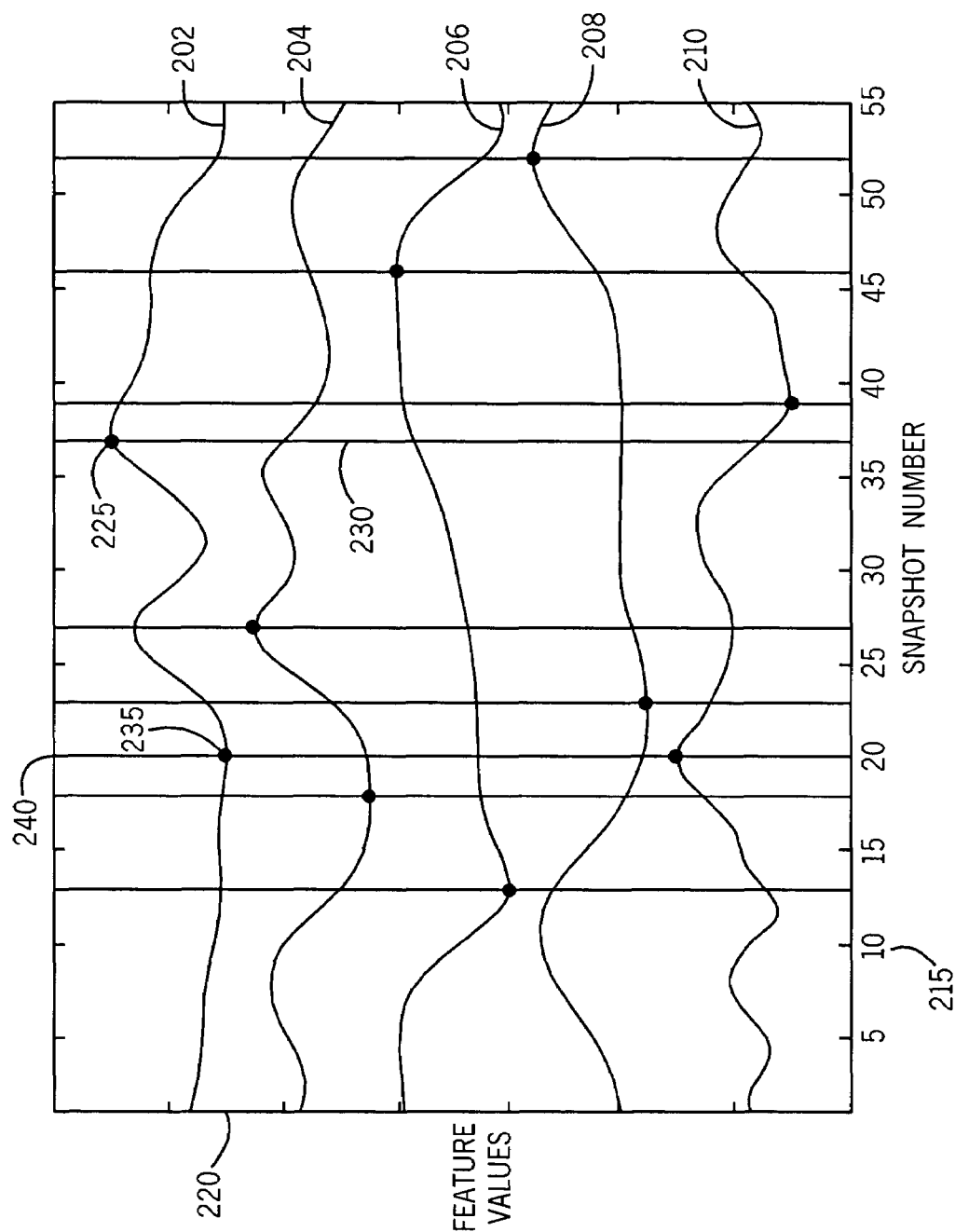
FIG. 2 illustrates a method for creating a reference library from collected sensor data for use in a similarity model of the invention.

Turning to FIG. 2, one method is graphically depicted for populating the learned state matrix 124. Five series of feature values 202, 204, 206, 208 and 210 are shown that may be derived from one or more sub-band components of a complex signal characterizing the operation of a process or machine to be monitored. It should be understood with this kind of empirical model that any number of parameters or features can be treated. The abscissa axis 215 is the sample number or time stamp of the computed feature (which typically is computed based on a moving window of m sub-band component signal values, where m can be tens to hundreds of samples). The feature values are digitally sampled and temporally correlated. The ordinate axis 220 represents the relative magnitude of each feature value over the samples or "snapshots". Each snapshot represents a vector of five elements, one value for each feature in that snapshot. Of all the feature data collected according to this training method, only those five-element snapshots are included in the learned state matrix that contain either a global minimum or a global maximum value for any given feature. Therefore, for feature series 202, the global maximum 225 justifies the inclusion of the five different feature values at the intersections of line 230 with each feature series, including global maximum 225, in the learned state matrix, as a single vector of five elements. Similarly, for feature series 202, the global minimum 235 justifies the inclusion of the five feature values at the intersections of line 240 with each feature series.

Other methods are known in the art to provide the learned state matrix for a similarity-based model, and can be employed in the current invention. Among the additional techniques for generating the learned state matrix are by way of example: (a) augmenting the min-max learned state matrix with vectors selected according to evenly distributed intervals in the range of a variable; (b) selecting vectors at evenly distributed intervals in the range of all vector lengths of all collected snapshots; and (c) augmenting either any mentioned technique with randomly selected snapshots.

Turning now to the difference detector 130, residuals are created for at least one and preferably many or all the sub-band features being modeled by differencing the estimates from the estimation engine 120 and the actual sub-band feature values from the feature extraction module 112. When the monitored monitored system is behaving "normally", it is expected that the sub-band feature values estimated by the estimation engine 120 and the actual sub-band feature values will yield residuals that are effectively zero. Generally, the problem faced in each successive snapshot is that there will be a certain amount of insignificant variation between the estimates and actual values, which can be treated as noise. One way to distinguish the noise from genuine divergence of the estimates and actual values is to apply a threshold to each sub-band feature residual that accommodates the noisiness of each such residual. A residual will then be marked as deviating only if the residual exceeds that threshold. Each residual can have its own threshold, and in fact the threshold can be updated on the fly by using a multiple of the standard deviation for that residual over a moving window of snapshots.

According to another way of coping with the noise in the residual, a cumulative statistical test can be applied, such as the sequential probability ratio test (SPRT), to determine when a deviation has occurred. The basic approach of the SPRT technique is to analyze successive observations of a sampled parameter. A sequence of sampled differences between the generated expected value and the actual value for a monitored component signal should be distributed according to some kind of distribution function around a mean of zero. Typically, this will be a Gaussian distribution, but it may be a different distribution, as for example a binomial distribution for a parameter that takes on only two discrete values (this can be common in telecommunications and networking machines and processes). Then, with each observation, a test statistic is calculated and compared to one or more decision limits or thresholds. The SPRT test statistic generally is the likelihood ratio $1_n$, which is the ratio of the probability that a hypothesis $H_1$ is true to the probability that a hypothesis $H_0$ is true:

$$l_n = \frac{(y_1, y_2, \ldots, y_n \mid H_1)}{(y_1, y_2, \ldots, y_n \mid H_0)} \quad (12)$$

where $Y_n$ are the individual observations and $H_n$ are the probability distributions for those hypotheses. This general SPRT test ratio can be compared to a decision threshold to reach a decision with any observation. For example, if the outcome is greater than 0.80, then decide $H_1$ is the case, if less than 0.20 then decide $H_0$ is the case, and if in between then make no decision.

The SPRT test can be applied to various statistical measures of the respective distributions. Thus, for a Gaussian distribution, a first SPRT test can be applied to the mean and a second SPRT test can be applied to the variance. For example, there can be a positive mean test and a negative mean test for data such as residuals that should distribute around zero. The positive mean test involves the ratio of the likelihood that a sequence of values belongs to a distribution $H_0$ around zero, versus belonging to a distribution $H_1$ around a positive value, typically the one standard deviation above zero. The negative mean test is similar, except $H_1$ is around zero minus one standard deviation. Furthermore, the variance SPRT test can be to test whether the sequence of values belongs to a first distribution $H_0$ having a known variance, or a second distribution $H_2$ having a variance equal to a multiple of the known variance.

For feature residuals derived for sub-band component signals from a complex signal behaving as expected, the mean is zero, and the variance can be determined empirically. Then in run-time monitoring mode, for the mean SPRT test, the likelihood that $H_0$ is true (mean is zero and variance is $\sigma^2$) is given by:

$$L(y_1, y_2, \ldots, y_n \mid H_0) = \frac{1}{(2\pi\sigma)^{n/2}} e^{[-\frac{1}{2\sigma^2}\sum_{k=1}^{n} y_k^2]} \qquad (13)$$

and similarly, for $H_1$, where the mean is M (typically one standard deviation below or above zero, using the variance determined for the residuals from normal operation) and the variance is again $\sigma^2$ (variance is assumed the same):

$$L(y_1, y_2, \ldots, y_n \mid H_1) = \qquad (14)$$
$$\frac{1}{(2\pi\sigma)^{n/2}} e^{[-\frac{1}{2\sigma^2}(\sum_{k=1}^{n} y_k^2 - 2\sum_{k=1}^{n} y_k M + \sum_{k=1}^{n} M^2)]}$$

The ratio $l_n$ from equations 9 and 10 then becomes:

$$l_n = e^{[-\frac{1}{2\sigma^2}\sum_{k=1}^{n} M(M-2y_k)]} \qquad (15)$$

A SPRT statistic can be defined for the mean test to be the exponent in equation 11:

$$SPRT_{mean} = -\frac{1}{2\sigma^2} \sum_{k=1}^{n} M(M - 2y_k) \qquad (16)$$

The SPRT test is advantageous because a user-selectable false alarm probability $\alpha$ and a missed alarm probability $\beta$ can provide thresholds against which $SPRT_{mean}$ can be tested to produce a decision:

1. If $SPRT_{mean} \leq l_n(\beta/(1-\alpha))$, then accept hypothesis $H_0$ as true;

2. If $SPRT_{mean} \geq l_n((1-\beta)/\alpha)$, then accept hypothesis $H_1$ as true; and 3. If $l_n(\beta/(1-\alpha)) < SPRT_{mean} < l_n((1-\beta)/\alpha)$, then make no decision and continue sampling.

For the variance SPRT test, the problem is to decide between two hypotheses: $H_2$ where the residual forms a Gaussian probability density function with a mean of zero and a variance of $V\sigma^2$; and $H_0$ where the residual forms a Gaussian probability density function with a mean of zero and a variance of $\sigma^2$. The likelihood that $H_2$ is true is given by:

$$L(y_1, y_2, \ldots, y_n \mid H_2) = \frac{1}{(2\pi V^{1/2}\sigma)^{n/2}} e^{[-\frac{1}{2V\sigma^2}\sum_{k=1}^{n} y_k^2]} \qquad (17)$$

The ratio $l_n$ is then provided for the variance SPRT test as the ratio of equation 13 over equation 9, to provide:

$$l_n = V^{-1/2} e^{[-\frac{1}{2\sigma^2}\sum_{k=1}^{n} y_k^2(\frac{1-V}{V})]} \qquad (18)$$

and the SPRT statistic for the variance test is then:

$$SPRT_{variance} = \frac{1}{2\sigma^2}\left(\frac{V-1}{V}\right)\sum_{k=1}^{n} y_k^2 - \frac{\ln V}{2} \qquad (19)$$

Thereafter, the above tests (1) through (3) can be applied as above:

1. If $SPRT_{variance} \leq l_n(\beta/(1-\alpha))$, then accept hypothesis $H_0$ as true;

2. If $SPRT_{variance} \geq l_n((1-\beta)/\alpha)$, then accept hypothesis $H_2$ as true; and 3. If $l_n(\beta/(1-\alpha)) < SPRT_{variance} < l_n((1-\beta)/\alpha)$, then make no decision and continue sampling.

Each snapshot of residuals (one residual "signal" per sub-band feature from the complex signal) that is passed to the difference detector 130, can have SPRT test decisions for positive mean, negative mean, and variance for each parameter in the snapshot. In an empirical model-based monitoring system according to the present invention, any such SPRT test on any such parameter that results in a hypothesis other than $H_0$ being accepted as true is effectively an alert on that parameter.

According to the invention, failures in the monitored system can be detected in the fault diagnosis module 134, which can employ numerous pattern recognition techniques known in the art to match a known failure mode with the pattern of SPRT alerts generated. For example, fault diagnosis module 134 can comprise a database of known fault conditions, with the SPRT alerts that should be present before the failure mode is diagnosed. Alternatively, the module 134 can output a list of likely candidates based on highest percentage of overlap between current SPRT alerts and SPRT alert membership in a known failure mode. Yet another alternative is to employ a rules-based system in module 134, wherein expert rules examine SPRT alerts and trigger chained rules to progressively identify the likely failure mode evidenced by the alert pattern. Expert rules systems appropriate for diagnostics are known in the art.

It should be appreciated that a wide range of changes and modifications may be made to the embodiments of the invention as described herein. Thus, it is intended that the foregoing detailed description be regarded as illustrative rather than limiting and that the following claims, including all equivalents, are intended to define the scope of the invention.

What is claimed is:

1. A method for early detection of a deviation from a selected condition in a monitored system comprising the steps of:
    measuring a signal from the system containing information about operation of the system;
    applying a plurality of filters to the signal for decomposing said signal into a plurality of sub-band components;
    determining at least one feature value for at least one of said sub-band components;
    generating an empirically-based estimate of said at least one feature value; and
    comparing said estimate and said determined at least one feature value to detect a deviation from the selected condition.

2. A method according to claim 1, wherein said feature value is a scalar statistical function of a window of samples of the at least one sub-band component.

3. A method according to claim 1, wherein said feature value is selected from the set of mean, variance, skewness, kurtosis, root mean square, median, percentiles, auto-regression (AR) coefficients, ARMA coefficients, and auto-correlation coefficients.

4. A method according to claim 1, wherein said generating step includes referencing a learned state matrix of exemplar states.

5. A method according to claim 4, wherein the estimate is a linear combination of at least some exemplar states in said learned state matrix.

6. A method according to claim 5, wherein the linear combination is determined according to a similarity operation between a set of actual feature values and the at least some exemplar states.

7. A method according to claim 1 wherein said comparing step comprises:
    generating a residual from a difference between said estimate and said determined feature value; and
    performing a sequential probability ratio test on said residual to determine a statistically significant change.

8. An apparatus for monitoring a system for early detection of faults, comprising:
    signal filter decomposition means disposed to decompose into a plurality of sub-band components a received signal indicative of operation of the system;
    feature extraction means for determining at least one feature value for at least one of said plurality of sub-band components;
    estimation means for generating an empirically-based estimate of said at least one feature value; and
    alerting means disposed to compare said estimate and said determined feature value and generate an alert in response to a deviation between said estimate and said determined feature.

9. An apparatus according to claim 8, wherein said feature extraction means computes said feature value as a scalar statistical function of a window of samples of the at least one of the plurality of sub-band components.

10. An apparatus according to claim 8, wherein said estimation means comprises a learned state matrix of exemplar states.

11. An apparatus according to claim 10, wherein said estimation means generates an estimate from a linear combination of at least some of the exemplar states in said learned state matrix.

12. An apparatus according to claim 11, wherein said estimation means employs a similarity operation to determine the linear combination.

13. An apparatus according to claim 8 wherein said alerting means generates a residual from a difference between said estimate and said determined feature value, and performs a sequential probability ratio test on said residual to determine a statistically significant change.

14. A method for detection of a deviation from a selected operating condition of a monitored system, comprising the steps of:
    measuring a signal from the monitored system with said signal containing information about operation of the monitored system;
    creating a greater number of signal values from the signal in the form of a plurality of sub-band components;
    determining at least one feature value for at least one of said sub-band components which are characteristic of the greater number of signal values;
    generating an empirically-based estimate of said at least one feature value; and
    comparing said empirically-based estimate and said at least one feature value to detect a deviation from the selected operating condition of the monitored system.

15. The method as defined in claim 14 wherein said feature value is a scalar statistical function of a window of samples of at least one sub-band component, the sub-band component being a function of the signal.

16. The method according to claim 14 wherein the signal comprises at least one sensed real data value.

17. The method as defined in claim 14 further including the step of applying a filter to the signal to create the plurality of sub-band components.

18. The method according to claim 14, wherein said generating step includes referencing a learned state matrix of exemplar states.

19. The method according to claim 18, wherein the estimate includes a combination of at least one of the exemplar states and the linear combination is determined according to a similarity operation between a set of actual feature values and the at least one of the exemplar states.

20. The method according to claim 14 wherein said comparing step comprises:
    generating a residual from a difference between said estimate and said determined feature value; and
    performing a sequential probability ratio test on said residual to determine a statistically significant change.

* * * * *

UNITED STATES PATENT AND TRADEMARK OFFICE
CERTIFICATE OF CORRECTION

PATENT NO. : 7,085,675 B2
APPLICATION NO. : 10/360843
DATED : August 1, 2006
INVENTOR(S) : Stephan W. Wegerich It is certified that error appears in the above-identified patent and that said Letters Patent is hereby corrected as shown below:

In column 1, above the section entitled 'Cross-Reference to Related Patent Applications', insert the following title and sentence:

--CONTRACTUAL ORIGIN OF THE INVENTION

This invention was made with government support under W-31-109-ENG-38 awarded by the Department of Energy. The government has certain rights in the invention.--

Signed and Sealed this

Twelfth Day of December, 2006

JON W. DUDAS
*Director of the United States Patent and Trademark Office*